United States Patent
Lee (10) Patent No.: US 7,382,431 B2
(45) Date of Patent: Jun. 3, 2008

(54) FRINGE FIELD SWITCHING MODE LIQUID CRYSTAL DISPLAY DEVICE

(75) Inventor: Yun-Bok Lee, Seoul (KR)

(73) Assignee: LG. Philips LCD. Co., Ltd., Seoul (KR)

( * ) Notice: Subject to any disclaimer, the term of this patent is extended or adjusted under 35 U.S.C. 154(b) by 203 days.

(21) Appl. No.: 10/875,120

(22) Filed: Jun. 23, 2004

(65) Prior Publication Data

US 2005/0128402 A1    Jun. 16, 2005

(30) Foreign Application Priority Data

Dec. 12, 2003  (KR) ...................... 10-2003-0090823

(51) Int. Cl.
   *G02F 1/1343*    (2006.01)
(52) U.S. Cl. ...................... 349/141; 349/129
(58) Field of Classification Search ............... 349/141, 349/144, 146, 129
   See application file for complete search history.

(56) References Cited

U.S. PATENT DOCUMENTS

| | | | |
|---|---|---|---|
| 5,844,645 A * | 12/1998 | Kashimoto ................... | 349/106 |
| 5,933,208 A * | 8/1999 | Kim ............................ | 349/106 |
| 6,356,328 B1 * | 3/2002 | Shin et al. ................... | 349/141 |
| 6,411,357 B1 | 6/2002 | Ting et al. | |
| 6,882,395 B2 * | 4/2005 | Liu ............................. | 349/141 |
| 6,888,604 B2 * | 5/2005 | Rho et al. .................... | 349/146 |
| 2001/0048501 A1 * | 12/2001 | Kim et al. ................... | 349/141 |
| 2003/0107695 A1 * | 6/2003 | Kubo et al. .................. | 349/129 |
| 2005/0128407 A1 * | 6/2005 | Lee et al. .................... | 349/141 |

FOREIGN PATENT DOCUMENTS

| | | |
|---|---|---|
| JP | 2000-089255 | 3/2000 |
| JP | 2001-154214 | 6/2001 |
| JP | 2002-006302 | 1/2002 |
| JP | 2002-182230 | 6/2002 |
| JP | 2003-186017 | 7/2003 |
| KR | 1999-0048947 | 7/1999 |
| KR | 10-0313946 | 10/2001 |
| KR | 10-0341123 | 4/2002 |
| KR | 2003-0048653 | 6/2003 |

OTHER PUBLICATIONS

Office Action dated Mar. 17, 2006 for corresponding Korean Application No. 10-2003-0090823.
Notice of Rejection for Corresponding Japanese Patent Application Serial No. 2004-192689, dated Aug. 14, 2007.

* cited by examiner

*Primary Examiner*—David Nelms
*Assistant Examiner*—Phu Vu
(74) *Attorney, Agent, or Firm*—Brinks Hofer Gilson & Lione (57) ABSTRACT

A fringe field switching mode liquid crystal display device includes first and second substrates with a liquid crystal layer disposed therebetween. A gate line and a data line crossing the gate line define a pixel region on the first substrate. A thin film transistor is connected to the gate line and the data line. A common line is parallel to and spaced apart from the gate line and a common electrode extends from the common line and has a substantially square shape corresponding to the pixel region. A curved pixel electrode is connected to the thin film transistor and overlaps the common electrode. A second substrate faces the first substrate. A black matrix formed on the first or second substrate includes an opening exposing the pixel region. The opening has corners.

49 Claims, 12 Drawing Sheets

FRINGE FIELD SWITCHING MODE LIQUID CRYSTAL DISPLAY DEVICE

This application claims the benefit of Korean Patent Application No. 2003-0090823, filed on Dec. 12, 2003, which is hereby incorporated by reference as if fully set forth herein.

BACKGROUND OF THE INVENTION

1. Field of the Invention

The present invention relates to a liquid crystal display device. More particularly, it relates to a fringe field switching mode liquid crystal display device having high transmittance and high aperture ratio.

2. Discussion of the Related Art

Liquid crystal display (LCD) devices are being developed as the next generation display devices because of their characteristics of light weight, thin profile, and low power consumption. In general, an LCD device is a non-emissive display device that displays images by making use of a refractive index difference through utilizing optical anisotropy properties of a liquid crystal material interposed between an array substrate and a color filter substrate. Of the different types of known liquid crystal displays (LCDs), active matrix LCDs (AM-LCDs), which have thin film transistors (TFTs) and pixel electrodes arranged in a matrix form, are the subject of significant research and development because of their high resolution and superiority in displaying moving images.

A conventional LCD device, generally, uses twisted nematic (TN) mode liquid crystal, the orientation of which is parallel to substrates and is continuously twisted from one substrate to another substrate by 90 degrees. However, the TN mode LCD device has disadvantages of a narrow viewing angle and slow response characteristics.

To solve the above problems, various modes, such as a multi-domain TN structure and an optically compensated birefringence (OCB) mode, have been proposed. In the multi-domain TN structure, a pixel is divided into several domains. The process of manufacturing the multi-domain is complicated, and there exists limitation in improving the viewing angle. The OCB mode has wide viewing angles and fast response time. However, in the OCB mode, it is difficult to control and maintain the liquid crystal material stably due to bias voltage.

In-plane switching mode liquid crystal display (IPS-LCD) devices, recently, have been proposed as a new display mode. In the IPS-LCD devices, electrodes for driving liquid crystal molecules are formed on the same substrate.

Figure 1:
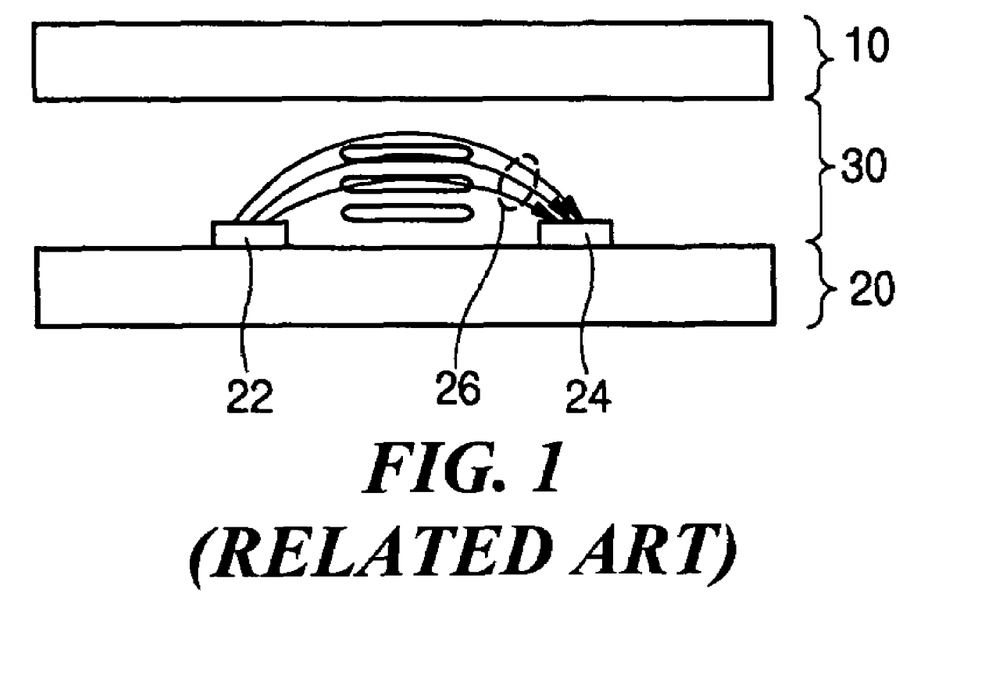
FIG. 1 is a cross-sectional view illustrating the concept of a related art IPS-LCD device.

FIG. 1 is a cross-sectional view illustrating the concept of a related art IPS-LCD device. As shown in FIG. 1, an upper substrate 10 and a lower substrate 20 are spaced apart from each other, and a liquid crystal layer 30 is interposed therebetween. The upper substrate 10 and lower substrate 20 are often referred to as a color filter substrate and an array substrate, respectively. A common electrode 22 and a pixel electrode 24 are positioned on the lower substrate 20. The common electrode 22 and pixel electrode 24 are positioned such that they are parallel to each other. On a surface of the upper substrate 10, a color filter layer (not shown) is commonly positioned to correspond to an area between the pixel electrode 24 and the common electrode 22 of the lower substrate 20.

A voltage applied across the common electrode 22 and pixel electrode 24 produces an in-plane electric field 26 through liquid crystal molecules of the liquid crystal layer 30. The liquid crystal molecules have a positive dielectric anisotropy, and thus the liquid crystal molecules will align so as to be in parallel with the electric field 26. The viewing angles can range 80 to 85 degrees in up-and-down and left-and-right sides from a line vertical to the IPS-LCD device, for example.

Figure 2:
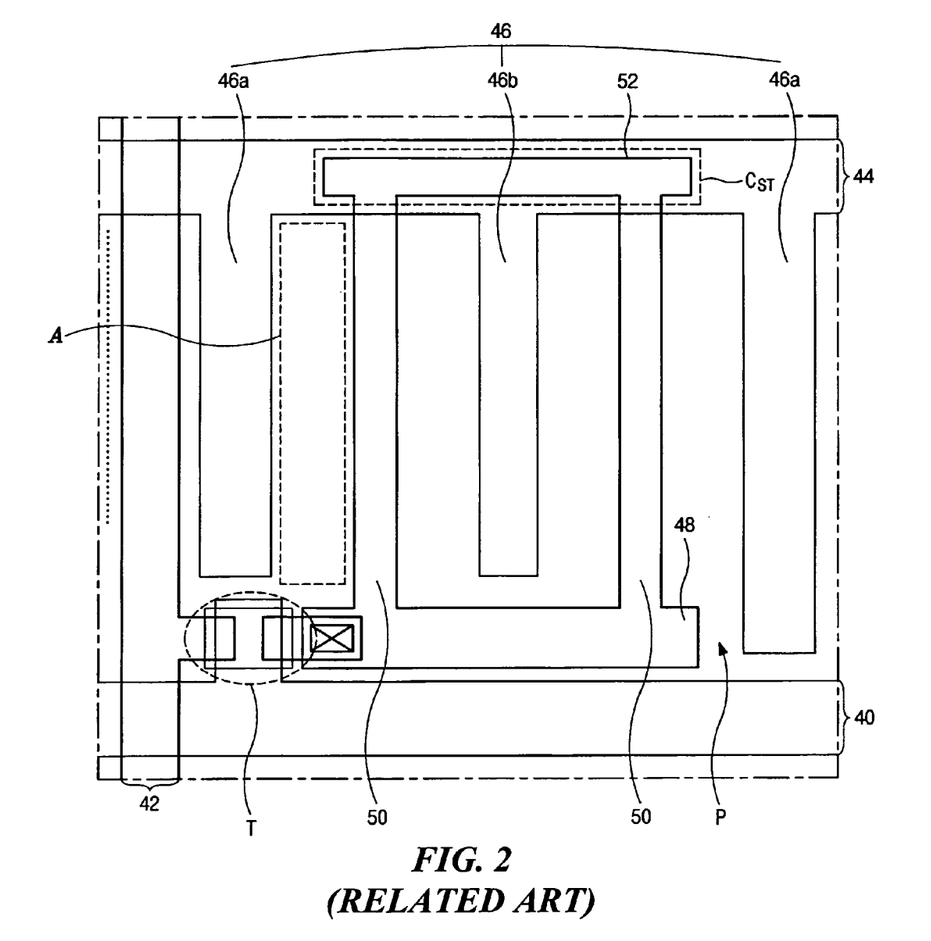
FIG. 2 is a plane view of an array substrate according to the related art IPS-LCD device.

FIG. 2 is a plane view of an array substrate according to the related art IPS-LCD device. As shown in FIG. 2, a gate line 40 and a data line 42 cross each other to define a pixel region P. At a crossing of the gate line 40 and the data line 42, a thin film transistor T is formed. A common line 44 is spaced apart from the gate line 40, and in the pixel region P, a plurality of common electrodes 46 extends from the common line 40 parallel to the data line 42.

A first pixel connecting line 48 is connected to the thin film transistor T, and a plurality of pixel electrodes 50 extends from the first pixel connecting line 48 alternating with the plurality of common electrodes 46. A second pixel connecting line 52 connects ends of the plurality of pixel electrodes 50, and the second pixel connecting line 52 overlaps the common line 44. The overlapped common line 44 and second pixel connecting line 52 form a storage capacitor $C_{ST}$ with an insulating layer interposed therebetween.

Spaces between the common electrodes 46 and the pixel electrodes 50 correspond to aperture areas A, where liquid crystal molecules are driven by an electric field parallel to a substrate. In the above array substrate, there exist 4 blocks of 4 aperture areas A in one pixel. That is, in the pixel region P, three common electrodes 46 and two pixel electrodes 50 alternate with each other.

The common electrodes 46 include two first common electrodes 46a that are near by the data line 42 and a second common electrode 46b that is disposed between the first common electrodes 46a. To minimize cross-talk between the data line 42 and the pixel electrodes 50 and to prevent light leakage, the first common electrodes 46a should have a wider width than the second common electrode 46b, and this reduces an aperture ratio.

To improve the aperture ratio and transmittance of the related art IPS-LCD device, fringe field switching (FFS) mode LCD device has been suggested. The FFS mode LCD device has a square common electrode of an island shape corresponding to the pixel region and a pixel electrode consisting of a plurality of rods that are spaced apart from each other and forming slits. The common electrode and the pixel electrode overlap each other with an insulating layer interposed therebetween. In the FFS mode LCD device, since electric fields are induced every several angstroms, the electric fields are strong, and thus even the liquid crystal molecules over the electrodes can be arranged by the electric fields. In addition, as the common electrode and the pixel electrode are formed of a transparent conductive material, the aperture ratio may be improved.

Figure 3A:
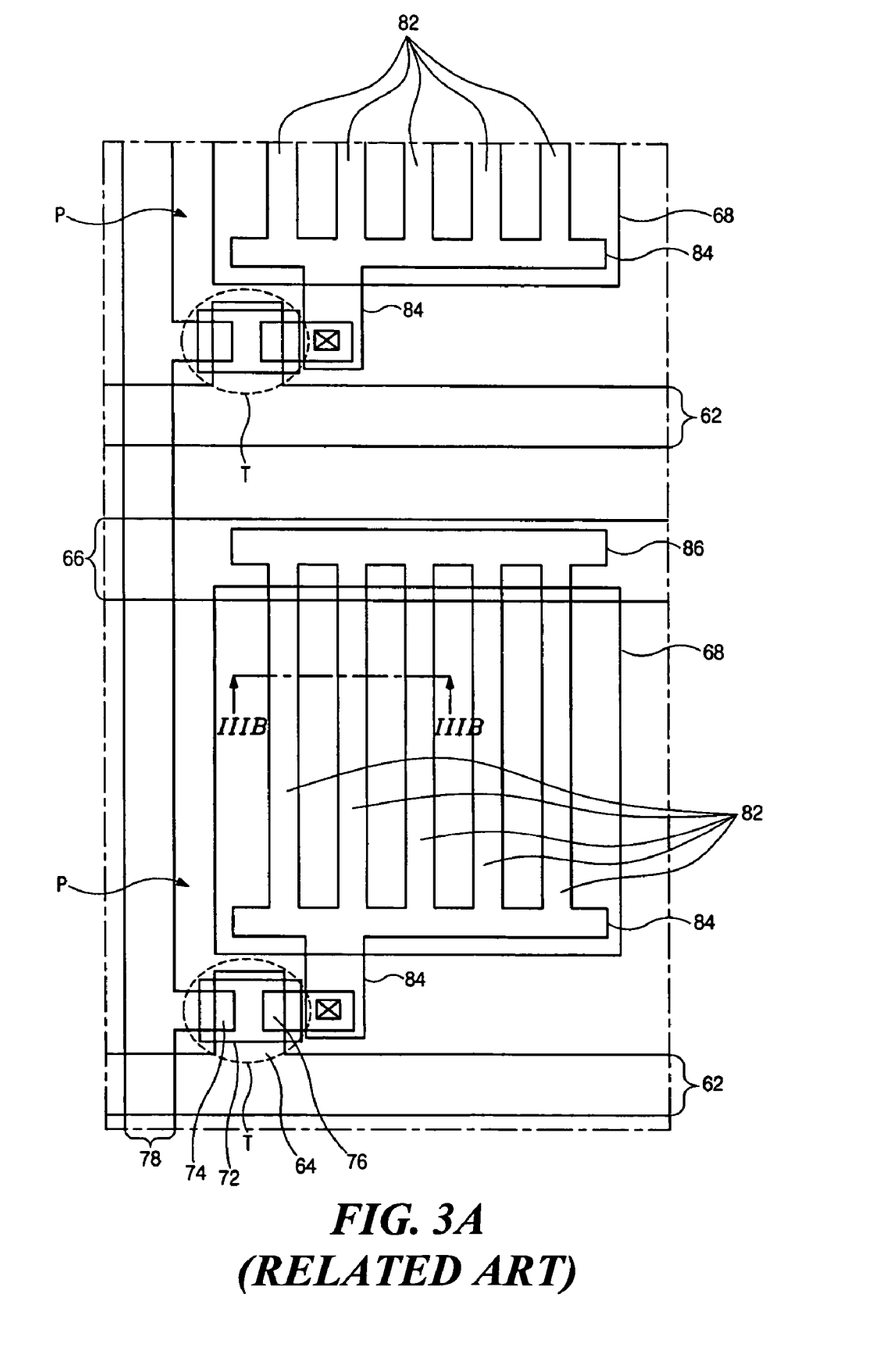
FIG. 3A is a plan view illustrating an FFS mode LCD device according to the related art.
Figure 3B:
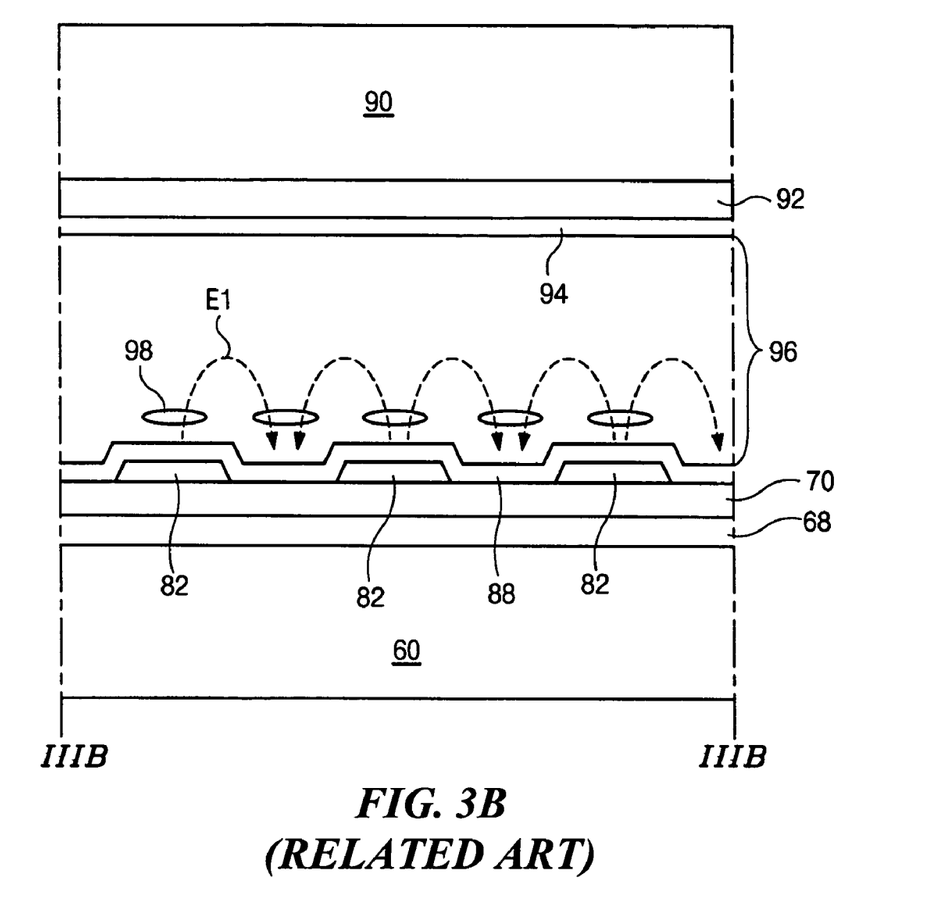
FIG. 3B is a cross-sectional view along the line IIIB-IIIB of FIG. 3A.

FIG. 3A is a plan view illustrating an FFS mode LCD device according to the related art, and FIG. 3B is a cross-sectional view along the line IIIB-IIIB of FIG. 3A. FIG. 3A shows mainly an array substrate of the FFS mode LCD device, and FIG. 3B illustrates a cross-section of the FFS mode LCD device including a liquid crystal layer in a corresponding cutting area.

In FIG. 3A, a gate line 62 and a data line 78 cross each other to define a pixel region P. A thin film transistor T is formed at a crossing of the gate line 62 and the data line 78. In the pixel region P, a plurality of pixel electrodes 82 connected to the thin film transistor T are spaced apart from each other. A common electrode 68 extends below the plurality of pixel electrodes 82.

More particularly, the thin film transistor T includes a gate electrode 64, a semiconductor layer 72, a source electrode 74 and a drain electrode 76. A first pixel connecting line 84 is connected to the drain electrode 76, and the plurality of pixel electrodes 82 extends from the first pixel connecting line 84. Ends of the plurality of pixel electrodes 82 are electrically connected to each other by a second pixel connecting line 86. The common electrode 86 of each pixel region P is connected to a common line 66, which is spaced apart from and is parallel to the gate line 62.

The common electrode 68 and the plurality of pixel electrodes 82 are formed of a transparent conductive material through different processes. The common line 66 is formed of the same material through the same process as the gate line 62. The common electrode 68 directly contacts the common line 66 without an insulating layer therebetween, and the plurality of pixel electrodes 82 are disposed over the common electrode 68 with an interposed insulating layer (not shown).

Operations of the FFS mode LCD device will be explained hereinafter through the cross-sectional structure of FIG. 3B. In FIG. 3B, a square common electrode 68 is formed on a first substrate 60, and a first insulating layer 70 covers the common electrode 68. A plurality of pixel electrodes 82 are formed on the first insulating layer 70 over the common electrode 68. The plurality of pixel electrodes 82 form slit shapes that are spaced apart from each other. A first alignment layer 88 covers the plurality of pixel electrodes 82.

A second substrate 90 is spaced apart from and faces the first substrate 60. A color filter layer 92 and a second alignment layer 94 are sequentially formed on an inner surface of the second substrate 90. A liquid crystal layer 96 is interposed between the first and second alignment layers 88 and 94.

In the FFS mode, the liquid crystal molecules between the electrodes are rotated by a lateral electric field to be parallel with the substrates, and then the liquid crystal molecules over the electrodes rotate due to vertical and lateral electric fields around the electrodes and an elastic force of the liquid crystal. That is, as light is also transmitted over the electrode, the transmittance is high. Moreover, rotation rates of the liquid crystal molecules are different in one pixel, and thus color shift is decreased by self-compensating effects.

If the electrodes may have stripe shapes, to form a lateral electric field, an alignment direction makes an angle of about 60 degrees with the gate line, which is a base line of 0 degree. Since the alignment direction is also inclined with respect to light transmission axes of polarizers (not shown), ranges of the viewing angle become non-uniform. The alignment direction may be within a range of 90 degrees to -270 degrees with respect to the base line, and the light transmission axes of the polarizers, which are 0 degrees and 90 degrees with respect to the base line, respectively, cross each other at a right angles. Therefore, viewing angle characteristics are lowered at directions of 45 degrees and 135 degrees.

In addition, there exists color shift difference according to angles of all directions, and thus the viewing angle characteristics are decreased.

SUMMARY OF THE INVENTION

Accordingly, the present invention is directed to an FFS mode LCD device that substantially obviates one or more of the problems due to limitations and disadvantages of the related art.

An advantage of the present invention is to provide an FFS mode LCD device where color shift is minimized.

Another advantage of the present invention is to provide an FFS mode LCD device having an improved viewing angle.

Additional features and advantages of the invention will be set forth in the description which follows and in part will be apparent from the description, or may be learned by practice of the invention. These and other advantages of the invention will be realized and attained by the structure particularly pointed out in the written description and claims hereof as well as the appended drawings.

To achieve these and other advantages, an embodiment in accordance with the principles of the present invention provides a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having a substantially square shape corresponding to the pixel region, a pixel electrode connected to the thin film transistor and having a ring shape, a second substrate facing the first substrate, a black matrix formed on one of the first and second substrates, and a liquid crystal layer between the first substrate and the second substrate. The black matrix includes an opening that has corners and exposes the pixel region. The pixel electrode overlaps the common electrode.

In another aspect, a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having a circular shape corresponding to the pixel region, a pixel electrode connected to the thin film transistor and having a substantially square shape, a second substrate facing the first substrate, a black matrix formed on one of the first and second substrates, and a liquid crystal layer between the first substrate and the second substrate. The black matrix includes an opening that has corners and exposes the pixel region. The pixel electrode overlaps the common electrode.

In another aspect, a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having a substantially square shape corresponding to the pixel region, a pixel electrode connected to the thin film transistor and having a spiral shape, a second substrate facing the first substrate, a black matrix formed on one of the first and second substrates, and a liquid crystal layer between the first substrate and the second substrate. The black matrix includes an opening that has corners and exposes the pixel region. The pixel electrode overlaps the common electrode.

In another aspect, a fringe field switching mode liquid crystal display device includes a gate line on a first substrate, a data line crossing the gate line to define a pixel region, a thin film transistor connected to the gate line and the data line, a common line parallel to and spaced apart from the gate line, a common electrode extending from the common line and having an open portion of a spiral shape corresponding to the pixel region, a pixel electrode connected to the thin film transistor and having a substantially square shape, a second substrate facing the first substrate, a black matrix formed on one of the first and second substrates, and a liquid crystal layer between the first substrate and the second substrate. The black matrix includes an opening that has corners and exposes the pixel region. The pixel electrode overlaps the common electrode.

In another aspect, a fringe field switching mode liquid crystal display device includes a first substrate, a gate line on the first substrate, a data line crossing the gate line to define a pixel region, a thin film transistor connected to the gate line and the data line, a common line parallel to and spaced apart from the gate line, a common electrode connected with the common line, a pixel electrode connected to the thin film transistor and overlapping the common electrode, a second substrate facing the first substrate, a liquid crystal layer between the first substrate and the second substrate, and a black matrix formed on one of the first and second substrates. The black matrix has an opening with substantially the same shape as an external shape of the common electrode, wherein the pixel and common electrodes are arranged in a multi-domain structure in which liquid crystals in the liquid crystal layer are substantially radially aligned from a center of the pixel region when a potential difference exists between the pixel and common electrodes.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate an embodiment of the present invention and together with the description serve to explain the principles of that invention.

DETAILED DESCRIPTION OF THE ILLUSTRATED EMBODIMENTS

Reference will now be made in detail to an illustrated embodiment of the present invention, examples of which are shown in the accompanying drawings. Wherever possible, similar reference numbers will be used throughout the drawings to refer to the same or similar parts.

Figure 4A:
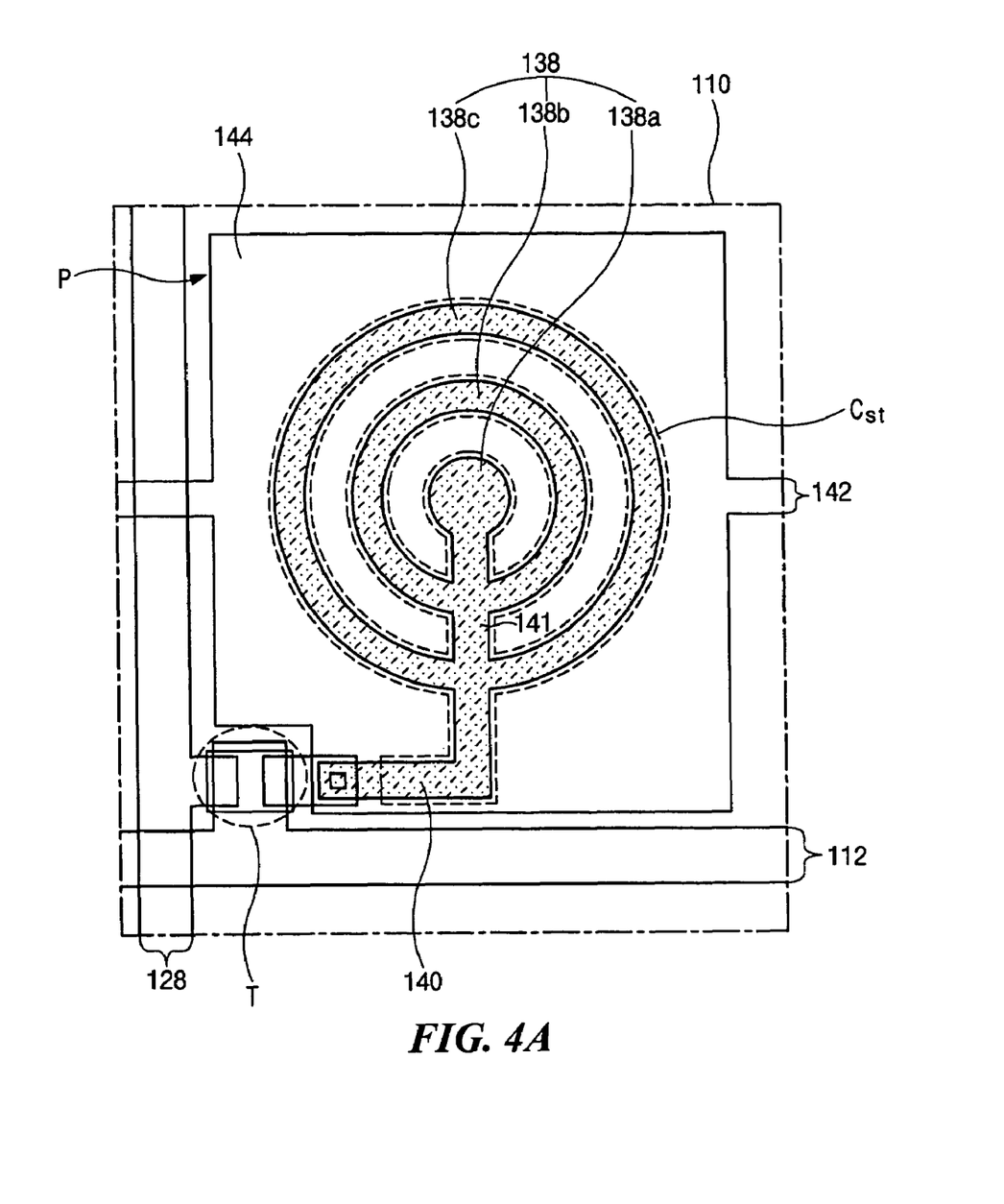
FIGS. 4A and 4B are plan views illustrating an FFS mode LCD device according to a first embodiment of the present invention.
Figure 4B:
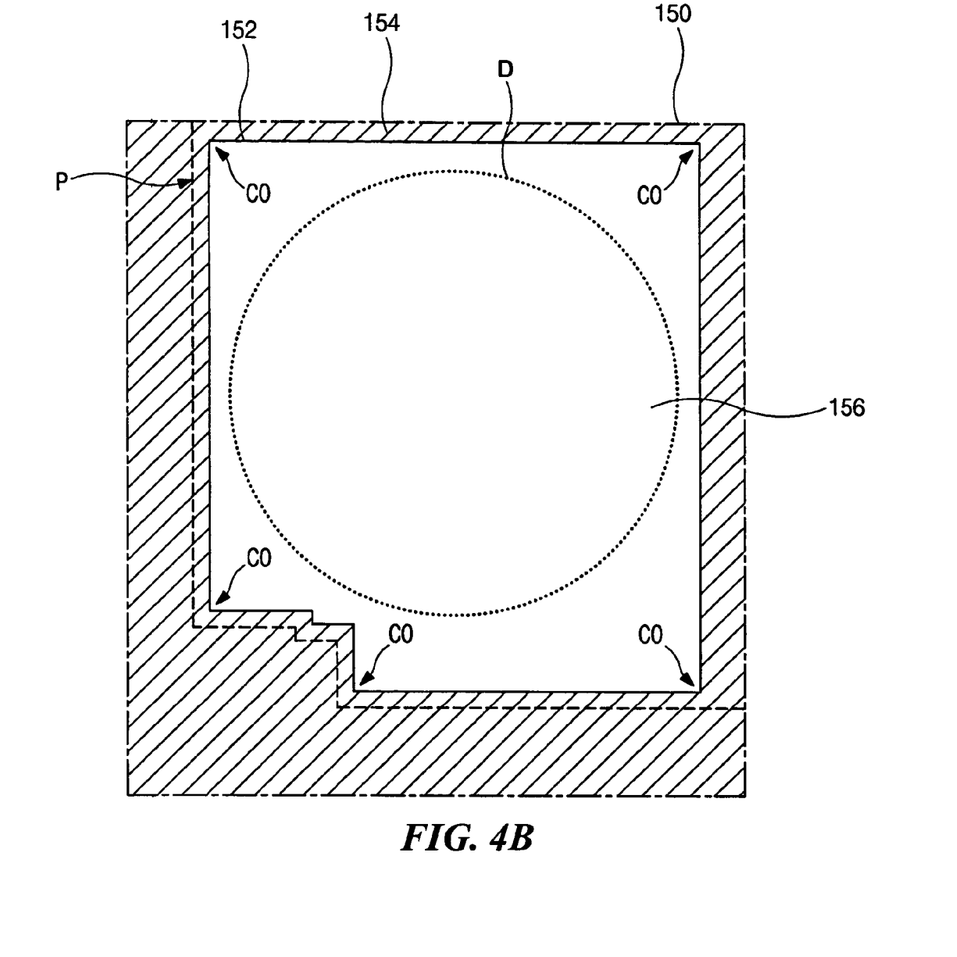

FIGS. 4A and 4B illustrate an FFS mode LCD device according to a first embodiment of the present invention. FIG. 4A is a plan view of an array substrate including lateral electric field electrodes and FIG. 4B is a plan view of a color filter substrate including a black matrix.

In FIG. 4A, a gate line 112 is formed in a first direction on a first substrate 110, and a data line 128 is formed in a second direction crossing the first direction. A common line 142 is formed in the first direction and is parallel to the gate line 112. The gate line 112 and the data line 128 cross each other to define a pixel region P. In the pixel region P, a common electrode 144 of a substantially square shape is connected to the common line 142.

A thin film transistor T is formed at a crossing of the gate line 112 and the data line 128, and is connected to the gate and data lines 112 and 128. A first pixel connecting line 140 is connected to the thin film transistor T. A second pixel connecting line 141 extends from the first pixel connecting line 140 along the second direction. A pixel electrode 138 including a plurality of circular and circular band patterns diverges from the second pixel connecting line 141. The pixel electrode 138 includes first, second and third pixel electrode patterns 138a, 138b, and 138c, which are concentric and have different sizes, from the center to the outer.

In the FFS mode of the present invention, spaces between the patterns of the pixel electrode 138 and an overlapping portion of the pixel electrode 138 and the common electrode 144 are used as an aperture area. Therefore, the pixel electrode 138 and the common electrode 144 are made of a transparent conductive material such as indium tin oxide (ITO).

Although an additional storage capacitor is not formed, the overlapping portion of the pixel electrode 138 and 144 serves as a storage capacitor Cst with an insulating layer (not shown) interposed therebetween.

In FIG. 4B, a black matrix 154 is formed on a second substrate 150, where the same pixel region P as FIG. 4A is defined. The black matrix 154 prevents light in an area where the liquid crystal molecules are not driven, and has an opening 152 exposing the pixel region P. The black matrix 154 has a margin within a certain range considering attachment of the substrates 110 and 150. Since portions covered with the black matrix 154 do not serve as an aperture area, the image quality is decreased dependent upon the width of the opening 152.

In the FFS mode of the present invention, a first electrode includes a plurality of patterns of circular and circular band shapes, and a second electrode has a substantially square shape. Both spaces between the patterns and an overlapping portion of the first and second electrodes are used as an aperture area. Additionally, some of liquid crystal molecules disposed outside the first electrode are driven by a fringe field induced in the FFS mode of the present invention.

In FIG. 4B, a circular area D in the opening 152 corresponds to a pixel electrode forming region of FIG. 4A. Beneficially, the opening 152 is spaced apart from the circular area D with a certain distance. In this embodiment, since the pixel electrode 138 of FIG. 4A has a circular or circular band shape, if the opening 152 has corners CO, the aperture ratio may be improved due to portions corresponding to the corners CO.

Meanwhile, a color filter layer 156 is formed in the opening 152 by using the black matrix 154 as an interface between colors.

In this embodiment, although the black matrix 154 and the color filter layer 156 are formed on the second substrate 150, the black matrix 154 and the color filter layer 156 may be formed on the first substrate 110 as desired. In this case, the black matrix 154 still includes an opening 156 having corners CO.

Figure 5A:
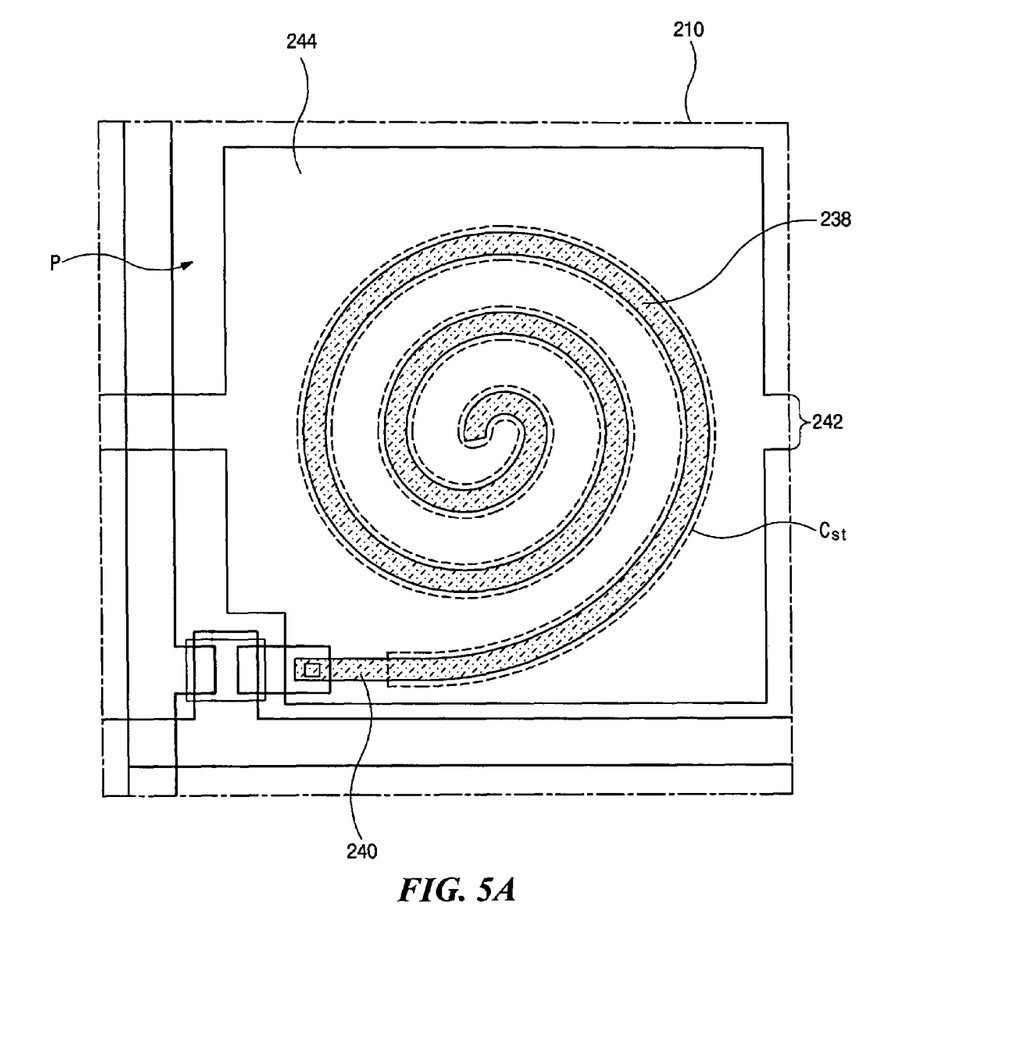
FIGS. 5A and 5B are plan views illustrating an FFS mode LCD device according to a second embodiment of the present invention.
Figure 5B:
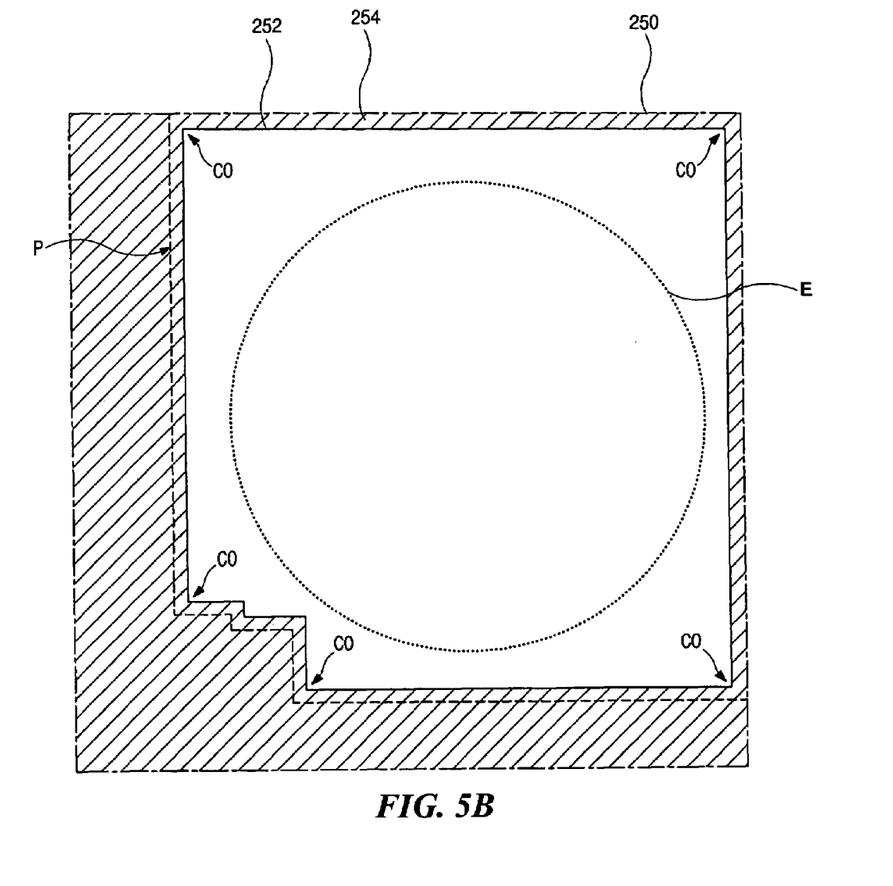

FIGS. 5A and 5B illustrate an FFS mode LCD device according to a second embodiment of the present invention in which the pixel electrode has a spiral shape. FIG. 5A is a plan view of an array substrate including lateral electric field electrodes and FIG. 5B is a plan view of a color filter substrate including a black matrix. Explanations for the same parts as the first embodiment may be omitted.

In FIG. 5A, a common electrode 244 of a square shape is formed in a pixel region P on a first substrate 210, and is connected to a common line 242. The common electrode 244 is connected to an adjacent common electrode in a neighbor pixel region (not shown) through the common line 242. A pixel connecting line 240 is connected to a thin film transistor T, and a pixel electrode 238 extends from the pixel connecting line 240. The pixel electrode 238 has a spiral shape and overlaps the common electrode 244.

In the first embodiment, the pixel electrode includes circular band shapes of closed curves, while in this embodiment, the pixel electrode 238 has the spiral shape, which is a curve that winds around a fixed center point at a continuously increasing or decreasing distance from the point.

In this embodiment, liquid crystal molecules in spaces formed by the spiral pattern of the pixel electrode 238 are driven by a lateral electric field between the pixel electrode 238 and the common electrode 244. The liquid crystal molecules in an overlapping portion of the pixel electrode 238 and the common electrode 244 are also driven, and light is emitted. Thus, the pixel electrode 238 and the common electrode 244 are formed of a transparent conductive material such as ITO.

The overlapping portion of the pixel electrode 238 and the common electrode 244 forms a storage capacitor Cst with an insulating layer interposed therebetween.

In FIG. 5B, a black matrix 254 is formed on a second substrate 250 similarly to the first embodiment. The black matrix 254 includes an opening 252 exposing the pixel region P. The opening 352 has corners CO, and thus an aperture ratio is improved due to portions corresponding to the corners CO.

A circular area E in the opening 252 corresponds to an electrode forming region of the spiral shape of FIG. 5A. Beneficially, the opening 252 is spaced apart from the circular area E with a certain distance.

Meanwhile, to improve the aperture ratio, the FFS mode LCD device may have a four-color pixel structure including red, green, blue and white sub pixels of a perfect rectangle.

Figure 6A:
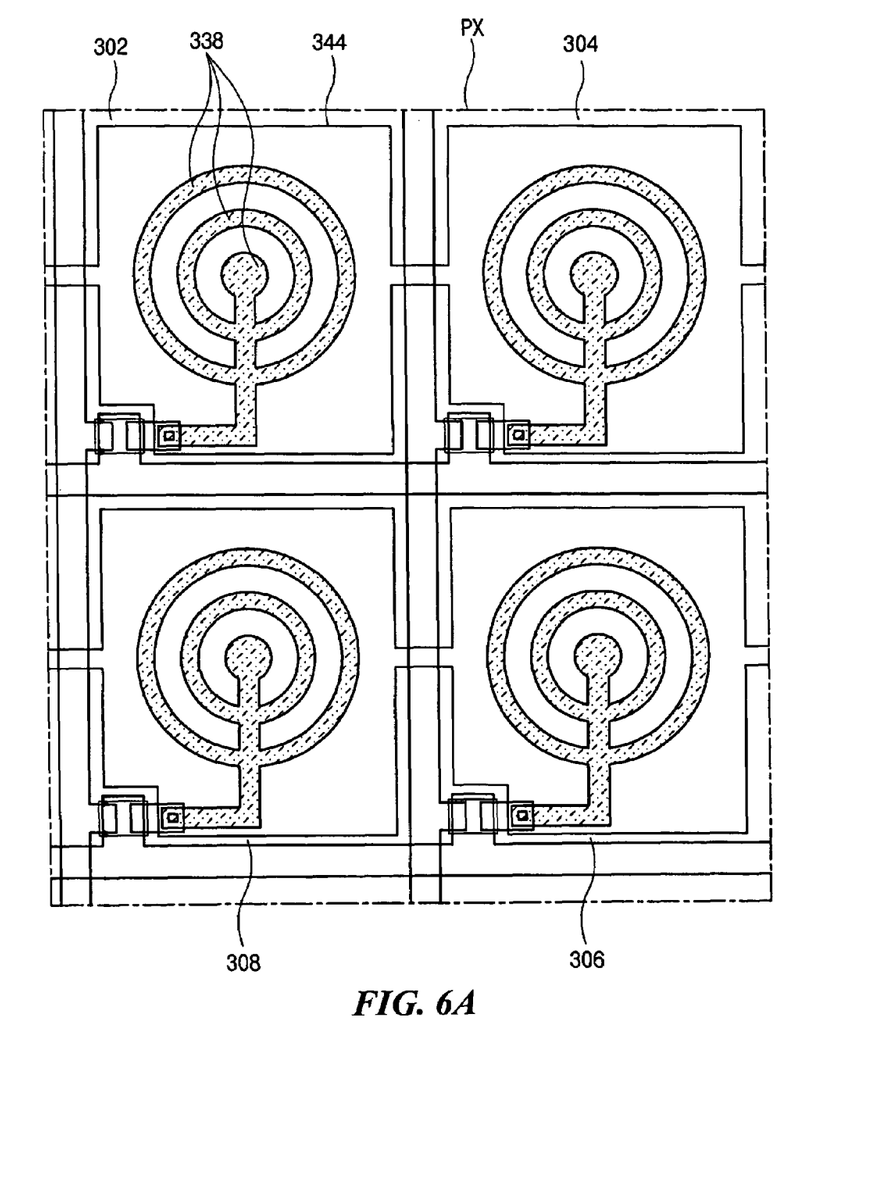
FIGS. 6A and 6B are plan views showing an FFS mode LCD device according to a third embodiment of the present invention.
Figure 6B:
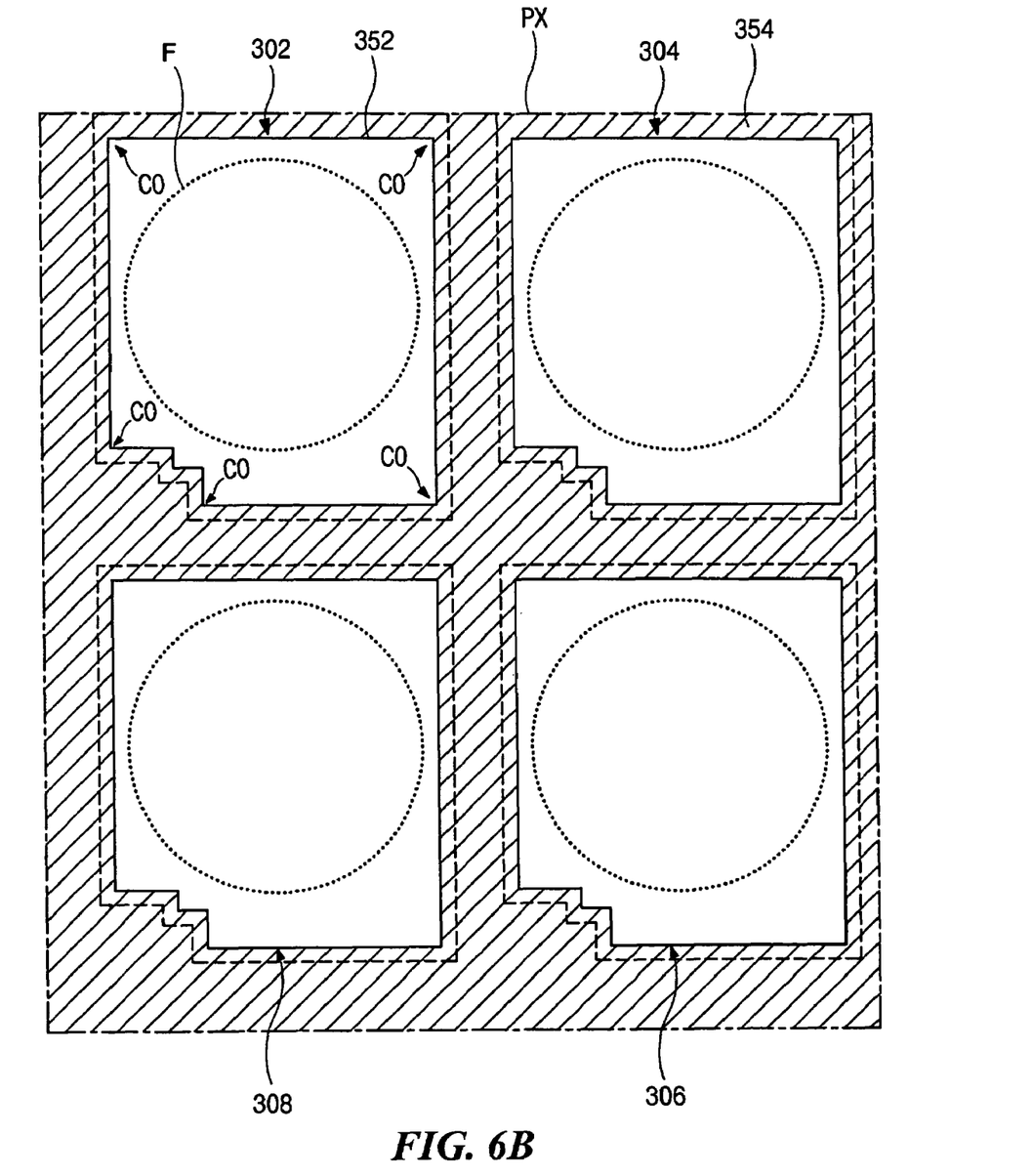

FIGS. 6A and 6B show an FFS mode LCD device according to a third embodiment of the present invention, and the FFS mode LCD device has a four color pixel structure, which includes red, green, blue and white sub pixels of a perfect rectangle. FIG. 6A is a plan view of an array substrate including lateral electric field electrodes and FIG. 6B is a plan view of a color filter substrate including a black matrix.

In a general three-color pixel structure, each sub-pixel has a rectangular shape. Therefore, a diameter of the circular or circular band electrode is determined by a width of a pixel region. Since a dummy region (the region excepting the circular or circular band electrode) occupies a large area, improvement in the aperture ratio is limited.

On the other hand, in a rectangular pixel structure, there are few obstacles to the determination of the diameter of the circular or circular band electrodes as distances from the central point of the pixel region to four sides of the rectangle are equal. Accordingly, the area that the dummy region occupies is reduced, thereby effectively improving the aperture ratio.

As shown in FIG. 6A, an FFS mode LCD device of the third embodiment has a four-color pixel structure, wherein a rectangular pixel PX is composed of red, green, blue and white rectangular sub-pixels 302, 304, 306 and 308. In each sub pixel 302, 304, 306 and 308, a common electrode 344 of a substantially square shape and a pixel electrode 338 of a circular or circular band shape are formed.

In FIG. 6B, a pixel PX, which is composed of red, green, blue and white sub pixels 302, 304, 306 and 308 of a perfect rectangle, is formed. A black matrix 354 is formed on an entire surface of a substrate. The black matrix 354 includes an opening 352 exposing a main portion of each sub pixel 302, 304, 306 and 308. The opening 352 corresponds to the pixel electrode 338. The opening 352 of the black matrix 354 has corners CO to increase an aperture area.

A circular area F in the opening 352 corresponds to a pixel electrode forming region of FIG. 6A. Beneficially, the opening 352 is spaced apart from the circular area F with a certain distance.

In another embodiment, the pixel electrode may have a square shape and the common electrode may have a circular or circular band shape.

Figure 7A:
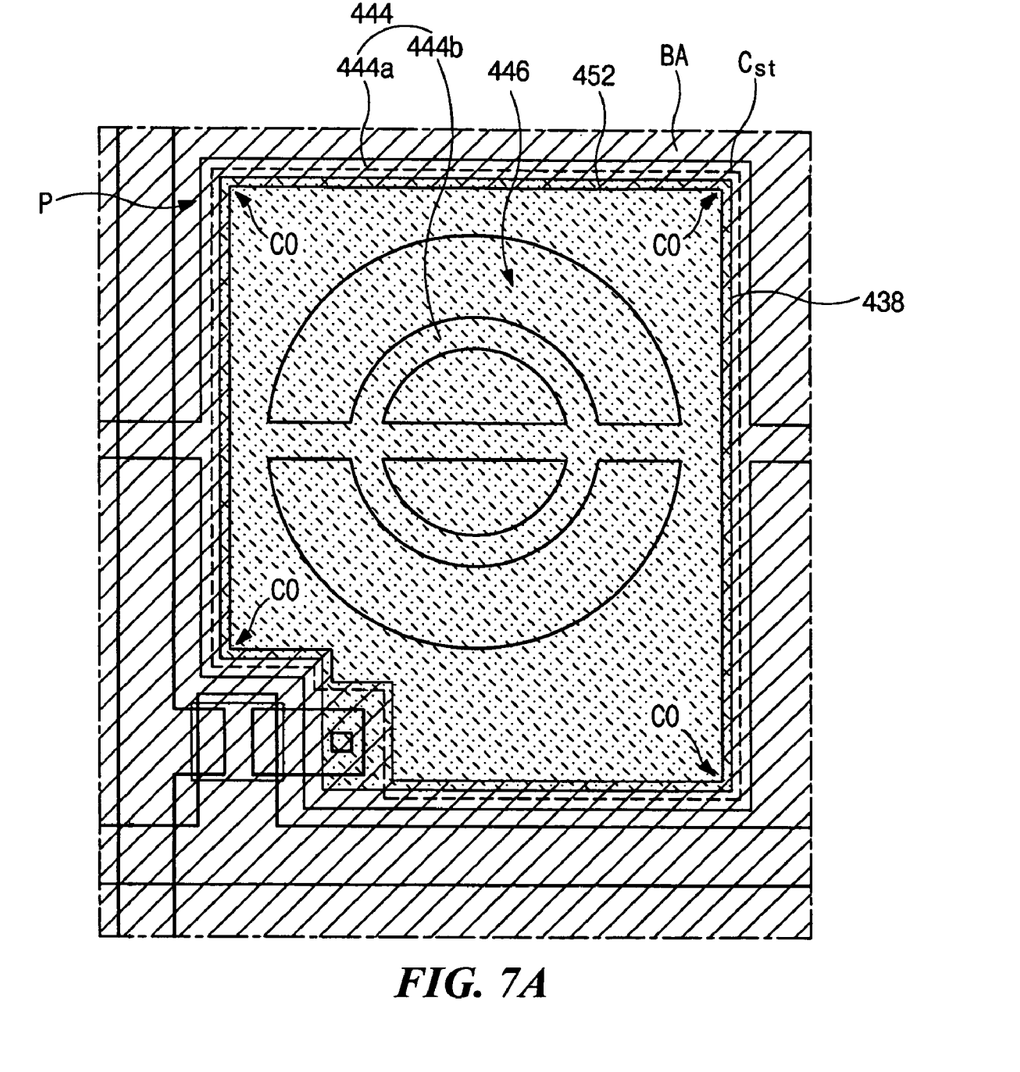
FIGS. 7A and 7B are plan views showing an FFS mode LCD device according to a fourth embodiment of the present invention.
Figure 7B:
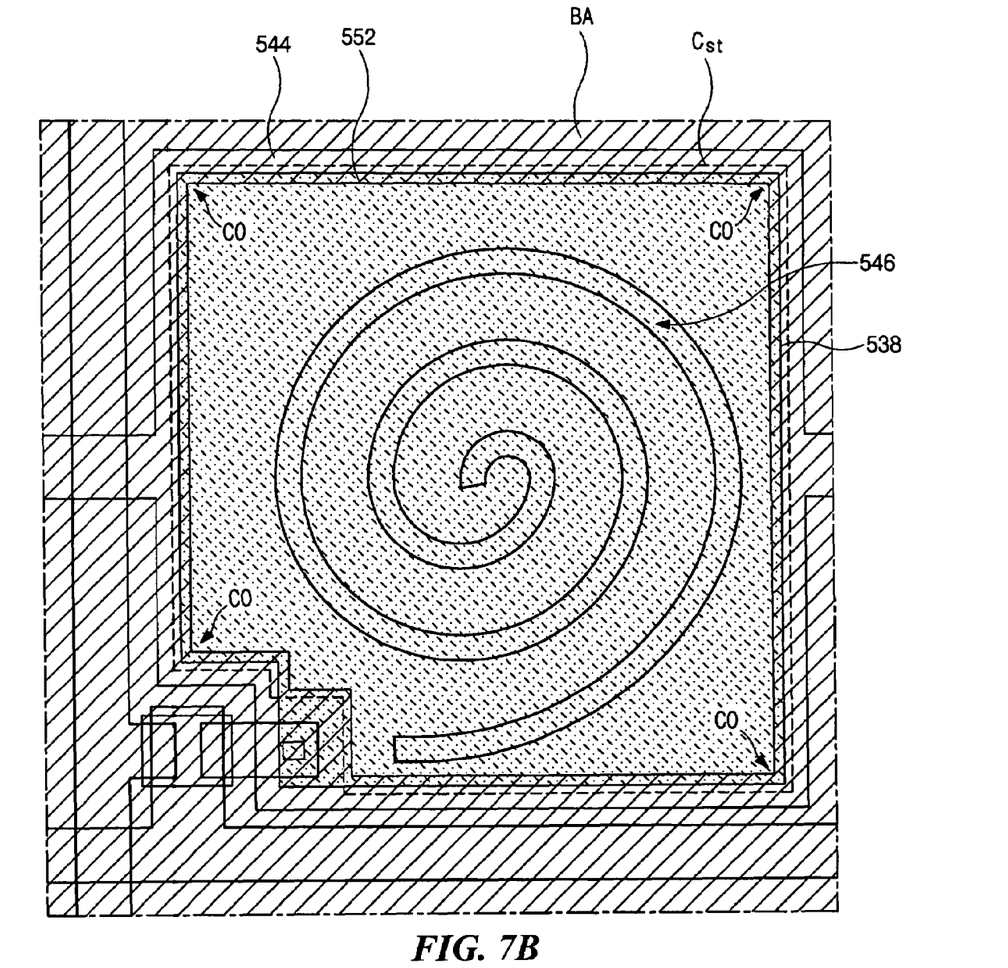

FIGS. 7A and 7B are plan views showing an FFS mode LCD device according to a fourth embodiment of the present invention. The FFS mode LCD device of FIG. 7A has a common electrode of a circular or circular band shape, and the FFS mode LCD device of FIG. 7B includes a common electrode of a spiral shape. Parts different from the first embodiment may be mainly explained.

In this embodiment, a pixel electrode 438 or 538 having a square shape is formed in a pixel region P. A common electrode 444 or 544 overlaps the pixel electrode 438 or 538.

The overlapped pixel electrode 438 or 538 and common electrode 444 or 544 form a storage capacitor Cst with an insulating layer interposed therebetween. The pixel electrode 438 or 538 and the common electrode 444 or 544 may be formed of a transparent conductive material such as indium tin oxide (ITO). Spaces between portions of the common electrode 444 or 544 and the overlapped portions of the common electrode 444 or 544 and the pixel electrode 438 or 538 are defined as an aperture area. Since the aperture area has a circular shape similarly to the first embodiment, characteristics of viewing angles are improved.

In FIG. 7A, the common electrode 444 includes a circular band shape, and in FIG. 7B, the common electrode 544 includes a spiral shape. More particularly, in FIG. 7A, the common electrode 444 has circular or circular band openings 446, and includes a first common electrode pattern 444*a* and a second common electrode pattern 444*b* inside the first common electrode pattern 444*a*. The second common electrode pattern 444*b* has a circular band shape. The pixel electrode 438 is smaller than the first common electrode pattern 444*a* and larger than the openings 446.

In FIG. 7B, the common electrode 544 corresponds to the pixel region P and has an opening 546 of a spiral shape. The pixel electrode 538 is smaller than the common electrode 544 and larger than the opening 546.

A black matrix BA of this embodiment may be formed on an opposite substrate similarly to the first to third embodiments, or may be formed on a substrate including the lateral electric field electrodes. The black matrix BA covers edges of the common electrode 444 or 544 and the pixel electrode 438 or 538. The black matrix BA includes an opening 452 or 552 exposing the pixel region P, and the opening 452 or 552 has corners CO to increase the aperture area. The circular shape of the common electrode 444 or 544 is exposed the opening 452 or 552.

In other embodiments, the pixel electrode or the common electrode may have an elliptical shape.

In the present invention, since the aperture area has a circular or circular band shape, directors of the liquid crystal material are equal in all directions and the viewing angles are improved. Additionally, the aperture ratio is increased due to a perfect rectangular pixel structure. Furthermore, as the opening of the black matrix corresponding to the aperture area has corners, the aperture area is increased, to thereby improve the aperture ratio.

It will be apparent to those skilled in the art that various modifications and variation can be made in an IPS-LCD device of the present invention without departing from the spirit or scope of the invention. Thus, it is intended that the present invention cover the modifications and variations of this invention provided they come within the scope of the appended claims and their equivalents.

What is claimed is:

1. A fringe field switching mode liquid crystal display device, comprising:
    a gate line on a first substrate;
    a data line crossing the gate line to define a pixel region;
    a thin film transistor connected to the gate line and the data line;
    a common line parallel to and spaced apart from the gate line;
    a common electrode extending from the common line and having a substantially square shape corresponding to the pixel region;
    a pixel electrode connected to the thin film transistor and having a ring shape, the pixel electrode overlapping the common electrode;
    a second substrate facing the first substrate;
    a black matrix formed on one of the first and second substrates, and including an opening exposing the pixel region, the opening having corners; and
    a liquid crystal layer between the first substrate and the second substrate.

2. The device of claim 1, further comprising a pixel connecting line between the thin film transistor and the pixel electrode.

3. The device of claim 1, wherein the pixel electrode and the common electrode are formed of a transparent conductive material.

4. The device of claim 1, wherein liquid crystal molecules of the liquid crystal layer are driven by an electric field parallel to the first and second substrates in portions between patterns of the pixel electrode and overlapping areas of the common electrode and the pixel electrode.

5. The device of claim 1, wherein the opening is larger than the pixel electrode and exposes the pixel electrode.

6. The device of claim 5, wherein the opening has a substantially square shape.

7. The device of claim 1, wherein the pixel electrode includes a plurality of patterns having different sizes and being concentric.

8. The device of claim 1, wherein the pixel region has a rectangular shape.

9. The device of claim 8, wherein the pixel region corresponds to a sub-pixel, and four sub-pixels of red, green, blue and white form one pixel.

10. The device of claim 1, wherein the black matrix is formed on a surface of the second substrate.

11. A fringe field switching mode liquid crystal display device, comprising:
    a gate line on a first substrate;
    a data line crossing the gate line to define a pixel region;
    a thin film transistor connected to the gate line and the data line;
    a pixel electrode connected to the thin film transistor and having a substantially square shape;
    a common line parallel to and spaced apart from the gate line;
    a common electrode extending from the common line and having a circular shape corresponding to the pixel region, the pixel electrode overlapping the common electrode;
    a second substrate facing the first substrate;
    a black matrix formed on one of the first and second substrates, and including an opening exposing the pixel region, the opening having corners; and
    a liquid crystal layer between the first substrate and the second substrate.

12. The device of claim 11, wherein the pixel electrode and the common electrode are formed of a transparent conductive material.

13. The device of claim 11, wherein liquid crystal molecules of the liquid crystal layer are driven by an electric field parallel to the first and second substrates in portions between patterns of the common electrode and overlapping areas of the common electrode and the pixel electrode.

14. The device of claim 11, wherein the opening of the black matrix exposes an open portion of the common electrode.

15. The device of claim 14, wherein the opening of the black matrix has a substantially square shape.

16. The device of claim 11, wherein the pixel region has a rectangular shape.

17. The device of claim 16, wherein the pixel region corresponds to a sub-pixel, and four sub-pixels of red, green, blue and white form one pixel.

18. The device of claim 11, wherein the black matrix is formed on a surface of the second substrate.

19. A fringe field switching mode liquid crystal display device, comprising:
    a gate line on a first substrate;
    a data line crossing the gate line to define a pixel region;
    a thin film transistor connected to the gate line and the data line;
    a common line parallel to and spaced apart from the gate line;
    a common electrode extending from the common line and having a substantially square shape corresponding to the pixel region;
    a pixel electrode connected to the thin film transistor and having a spiral shape, the pixel electrode overlapping the common electrode;
    a second substrate facing the first substrate;
    a black matrix formed on one of the first and second substrates, and including an opening exposing the pixel region, the opening having corners; and
    a liquid crystal layer between the first substrate and the second substrate.

20. A fringe field switching mode liquid crystal display device, comprising:
- a gate line on a first substrate;
- a data line crossing the gate line to define a pixel region;
- a thin film transistor connected to the gate line and the data line;
- a pixel electrode connected to the thin film transistor and having a substantially square shape;
- a common line parallel to and spaced apart from the gate line;
- a common electrode extending from the common line and having an open portion of a spiral shape corresponding to the pixel region, the pixel electrode overlapping the common electrode;
- a second substrate facing the first substrate;
- a black matrix formed on one of the first and second substrates, and including an opening exposing the pixel region, the opening having corners; and
- a liquid crystal layer between the first substrate and the second substrate.

21. A fringe field switching mode liquid crystal display device, comprising:
- a first substrate;
- a gate line on the first substrate;
- a data line crossing the gate line to define a pixel region;
- a thin film transistor connected to the gate line and the data line;
- a common line parallel to and spaced apart from the gate line;
- a common electrode connected with the common line;
- a pixel electrode connected to the thin film transistor, the pixel electrode overlapping the common electrode;
- a second substrate facing the first substrate;
- a liquid crystal layer between the first substrate and the second substrate; and
- a black matrix formed on one of the first and second substrates, the black matrix having an opening with substantially the same shape as an external shape of the common electrode,
- wherein the pixel and common electrodes are arranged in a multi-domain structure in which liquid crystals in the liquid crystal layer are substantially radially aligned from a center of the pixel region when a potential difference exists between the pixel and common electrodes.

22. The device of claim 21, wherein the opening of the black matrix has substantially the same shape as the pixel electrode.

23. The device of claim 21, wherein the opening of the black matrix has a different shape from that of an external shape the pixel electrode.

24. The device of claim 23, wherein the opening of the black matrix is substantially rectangular.

25. The device of claim 24, wherein a portion of the external shape of the pixel electrode is curved.

26. The device of claim 23, wherein a distance between the opening of the black matrix and an edge of a pixel electrode forming region in which the pixel electrode is formed is maximized at one or more corners of the opening of the black matrix.

27. The device of claim 21, wherein the opening of the black matrix has a plurality of corners.

28. The device of claim 27, wherein the opening of the black matrix has at least 5 corners.

29. The device of claim 21, wherein a portion of the pixel electrode is curved.

30. The device of claim 21, wherein the pixel electrode is substantially rectangular.

31. The device of claim 30, wherein the pixel electrode is larger than the opening of the black matrix.

32. The device of claim 30, wherein the common electrode is substantially rectangular.

33. The device of claim 32, wherein the common electrode is larger than the opening of the black matrix.

34. The device of claim 21, wherein a portion of an opening in the common electrode is curved.

35. The device of claim 34, wherein the opening of the black matrix is larger than the opening in the common electrode.

36. The device of claim 35, wherein the common electrode is larger than the opening of the black matrix.

37. The device of claim 34, wherein the pixel electrode is smaller than the common electrode and larger than the opening in the common electrode.

38. The device of claim 37, wherein the common electrode is larger than the opening of the black matrix.

39. The device of claim 37, wherein the pixel electrode is larger than the opening of the black matrix.

40. The device of claim 21, wherein an electric field between the pixel and common electrodes is substantially constant independent of the potential difference between the pixel and common electrodes.

41. The device of claim 21, wherein a pixel of the display contains a set of $2^{2n}$ adjacent pixel regions, in which n is an integer.

42. The device of claim 41, further comprising color filters of different colors formed on the second substrate, the set of adjacent pixel regions having $2^{2m}$ different color filters, where m is an integer less than or equal to n.

43. The device of claim 42, wherein the different colors in the pixel comprise red, blue, green, and white.

44. The device of claim 42, wherein the pixel and common electrodes in each pixel region in the pixel have the same shape.

45. The device of claim 44, wherein at least one of the pixel and common electrodes in a first pixel region in the set of adjacent pixel regions is a different shape from the pixel electrode or common electrode in a second pixel region in the set of adjacent pixel regions.

46. The device of claim 42, wherein the openings in the black matrix in the pixel have the same shape.

47. The device of claim 42, wherein one or more openings in the black matrix in the set of adjacent pixel regions have a different shape from one or more other opening in the black matrix in the set of adjacent pixel regions.

48. The device of claim 21, wherein substantially all of the pixel electrode is formed within the opening of the black matrix.

49. The device of claim 21, wherein a distance between a pixel forming region within which substantially all of the pixel electrode is formed and an edge of the opening of the black matrix is larger than a distance between an edge of the common electrode and the edge of the opening of the black matrix.

* * * * *